US012746856B2

(12) United States Patent
Koh

(10) Patent No.: US 12,746,856 B2
(45) Date of Patent: Sep. 29, 2026

(54) APPARATUS AND METHOD OF CONTROLLING POSITION OF SEAT FOR VEHICLE

(71) Applicant: Hyundai Transys Inc., Seosan-si (KR)

(72) Inventor: Sang Kyung Koh, Yongin-si (KR)

(73) Assignee: Hyundai Transys Inc., Seosan-si (KR)

( * ) Notice: Subject to any disclaimer, the term of this patent is extended or adjusted under 35 U.S.C. 154(b) by 136 days.

(21) Appl. No.: 18/526,639

(22) Filed: Dec. 1, 2023

(65) Prior Publication Data

US 2024/0190300 A1 Jun. 13, 2024

(30) Foreign Application Priority Data

Dec. 8, 2022 (KR) ........................ 10-2022-0170668

(51) Int. Cl.
*B60N 2/02* (2006.01)
*B60N 2/12* (2006.01)

(52) U.S. Cl.
CPC ......... *B60N 2/0278* (2023.08); *B60N 2/0233* (2023.08); *B60N 2/0272* (2023.08); *B60N 2/12* (2013.01)

(58) Field of Classification Search
CPC .. B60N 2/0278; B60N 2/0233; B60N 2/0272; B60N 2/12; B60N 2/002; B60N 2/0244; B60N 2/0268; B60N 2/22; B60N 2/39; B60N 2/16; B60N 2/18; B60N 2205/20; B60R 16/037
See application file for complete search history.

(56) References Cited

U.S. PATENT DOCUMENTS 9,610,862 B2 * 4/2017 Bonk .................. B60N 2/0278
10,086,728 B2 * 10/2018 White .................. B60N 2/0277

FOREIGN PATENT DOCUMENTS

| | | | | | |
|---|---|---|---|---|---|
| CN | 107901792 | B | * | 9/2020 | B60R 16/037 |
| CN | 115352327 | B | * | 8/2023 | B60N 2/0244 |
| DE | 102021204802 | A1 | * | 11/2022 | B60N 2/34 |
| KR | 20180125810 | A | * | 11/2018 | B60N 2/39 |
| KR | 10-2021-0122971 | A | | 10/2021 | |
| KR | 10-2022-0102098 | A | | 7/2022 | |

OTHER PUBLICATIONS

English Translation and Original Text of CN-115352327-B, Wu, Pan-feng (Year: 2023).*
English Translation and Original Text of CN-107901792-B, Zhang, En-li (Year: 2020).*
(Continued)

*Primary Examiner* — Kito R Robinson
*Assistant Examiner* — Kevin Jerome Harvey, II
(74) *Attorney, Agent, or Firm* — Bridgeway IP Law Group, PLLC; Jihun Kim

(57) ABSTRACT

An apparatus for controlling a position of a seat for a vehicle includes: an input unit for receiving a relaxation mode operation command for a vehicle seat from a user; a determination unit for determining a current position state of the vehicle by using a G-sensing value for the vehicle seat and a reference position value for the vehicle based on the relaxation mode operation command; and a control unit for controlling an operation module of the vehicle seat to compensate a position of the vehicle seat when the vehicle is located on an inclined road.

8 Claims, 4 Drawing Sheets

(56) References Cited

OTHER PUBLICATIONS

English translation of CN-107901792-B Zhang, En-li (Year: 2020).*
English translation of CN-115352327-B Wu, Pan-feng (Year: 2023).*
English translation of DE-102021204802-A1 Bennemann, Mark (Year: 2022).*
English translation of KR-20180125810-A Park, Jong Min (Year: 2018).*

* cited by examiner

APPARATUS AND METHOD OF CONTROLLING POSITION OF SEAT FOR VEHICLE

CROSS-REFERENCE TO RELATED APPLICATIONS

This application claims priority to and the benefit of Korean Patent Application No. 10-2022-0170668 filed in the Korean Intellectual Property Office on Dec. 8, 2022, the entire contents of which are incorporated herein by reference.

TECHNICAL FIELD

The present invention relates to an apparatus and a method of controlling a position of a seat for a vehicle.

BACKGROUND ART

In recent years, vehicle seats have been equipped with various functions for customer convenience.

For example, vehicle seats come with functions, such as seat-specific recline mode, front and rear seat recline interlocking mode, reading mode, and image viewing mode.

However, the existing vehicle seat mode does not implement a function to reflect the current position of the vehicle after the one-touch operation and change the operation of the vehicle seat.

For example, when the vehicle is traveling on an inclined road or stopping on an incline after a relaxation mode (a mode that enables zero gravity) operation of the vehicle seat, there is no function to change the operation of the vehicle seat in consideration of a road condition on which the vehicle is located, making it difficult to provide the same comfort to the user as before.

Prior Art Literature

Patent Document (Patent Document 1) Korean Patent Application Laid-Open No. 10-2021-0122971

SUMMARY OF THE INVENTION

The present invention has been made in an effort to provide an apparatus and a method of controlling a position of a seat for a vehicle, which have a function of changing an operation of a vehicle seat in consideration of a road condition on which a vehicle is located when the vehicle is traveling on an inclined road or stopping on an incline after a relaxation mode (a mode that enables zero gravity) operation of the vehicle seat.

An exemplary embodiment of the present invention provides an apparatus for controlling a position of a seat for a vehicle, the apparatus including: an input unit for receiving a relaxation mode operation command for a vehicle seat from a user; a determination unit for determining a current position state of the vehicle by using a position sensing value for the vehicle seat and a reference position value for the vehicle based on the relaxation mode operation command; and a control unit for controlling an operation module of the vehicle seat to compensate a position of the vehicle seat when the vehicle is located on an inclined road.

The reference position value may be prepared based on sensing information of a track-mounted G-sensor installed under the vehicle seat, a yaw rate G-sensor mounted on the vehicle, or an Electronic Stability Control (ESC) device of the vehicle.

The determination unit may determine that position compensation of the vehicle seat is required when a difference between the position sensing value for the vehicle seat and the reference position value is equal to or greater than a predetermined reference threshold.

When position compensation of the vehicle seat is required, the control unit may calculate a tilt of the vehicle by using the reference position value, and control the operation module of the vehicle seat using the tilt of the vehicle.

After the compensation control of the control unit, the determination unit may determine whether the control of the control unit is completed by using the position sensing value of the vehicle seat and the reference position value.

Another exemplary embodiment of the present invention provides a method of controlling a position of a seat for a vehicle, the method including: an input operation of receiving, by an input unit, a relaxation mode operation command for a vehicle seat from a user; a determination operation of determining, by a determination unit, a current position state of the vehicle by using a position sensing value for the vehicle seat and a reference position value for the vehicle based on the relaxation mode operation command; and a position control operation of controlling, by a control unit, an operation module of the vehicle seat to compensate a position of the vehicle seat when the vehicle is located on an inclined road.

The reference position value may be prepared based on sensing information of a track-mounted G-sensor installed under the vehicle seat, a yaw rate G-sensor mounted on the vehicle, or an Electronic Stability Control (ESC) device of the vehicle.

In the determination operation, the determination unit may determine that position compensation of the vehicle seat is required when a difference between the position sensing value for the vehicle seat and the reference position value is equal to or greater than a predetermined reference threshold.

In the position control operation, when position compensation of the vehicle seat is required, the control unit may calculate a tilt of the vehicle by using the reference position value, and control the operation module of the vehicle seat using the tilt of the vehicle.

The method may further include a compensation determination operation of determining, by the determination unit, whether the control of the control unit is completed by using the position sensing value of the vehicle seat and the reference position value, after the compensation control of the control unit.

The apparatus and the method of controlling a position of a seat for a vehicle according to the exemplary embodiments of the present invention have the effect of changing an operation of a vehicle seat in consideration of a road condition on which a vehicle is located when the vehicle is traveling on an inclined road or stopping on an incline after a relaxation mode (a mode that enables zero gravity) operation of the vehicle seat, thereby providing the same comfort to the user as before.

Further, the apparatus and the method of controlling a position of a seat for a vehicle according to the exemplary embodiments of the present invention have the effect in improving productivity of the vehicle.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

Figure 1:
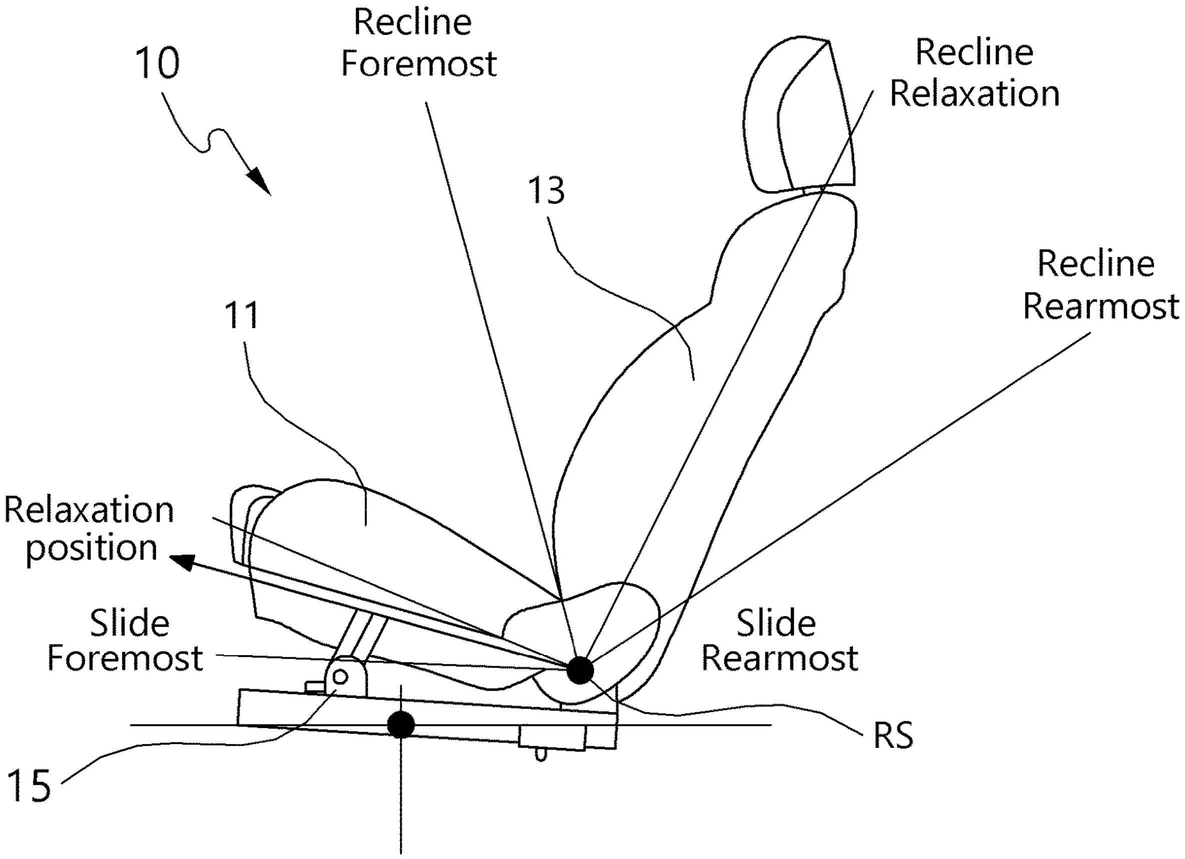
FIG. 1 is a diagram illustrating movement of a position of a vehicle seat according to a relaxation mode.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. It should be understood that although the exemplary embodiment of the present invention is described hereafter, the spirit of the present invention is not limited thereto and the present invention may be changed and modified in various ways by those skilled in the art.

FIG. 1 is a diagram illustrating movement of a position of a vehicle seat according to a relaxation mode.

Referring to FIG. 1, a vehicle seat 10 includes a cushion part 11 configured to rest on a buttock portion of a user, a backrest part 13 configured to extend vertically from one end of the cushion part 11 to support a back portion of the user, and an operation module 15 coupled to the cushion part 11 and the backrest part 13 and configured to perform position movement and angle adjustment of the cushion part 11 and the backrest part 13.

The operation module 15 may perform a slide foremost and a slide rearmost motion of the cushion part 11 during a relaxation mode operation of the vehicle seat 10. The operation module 15 may be mounted on a separate track within the vehicle to allow the cushion part 11 to be moved a predetermined length forward or a predetermined length backward relative to its initial position.

Furthermore, the operation module 15 may perform an angle adjustment of the cushion part 11 and the backrest part 13 based on a predetermined relaxation position and recline relaxation position when the vehicle seat 10 is operated in the relaxation mode. The cushion part 11 and the backrest part 13 are rotatable about a left-right rotation axis RS connecting ends of the cushion part 11 and the backrest part 13 when the angle is adjusted by the operation module 15.

Figure 2:
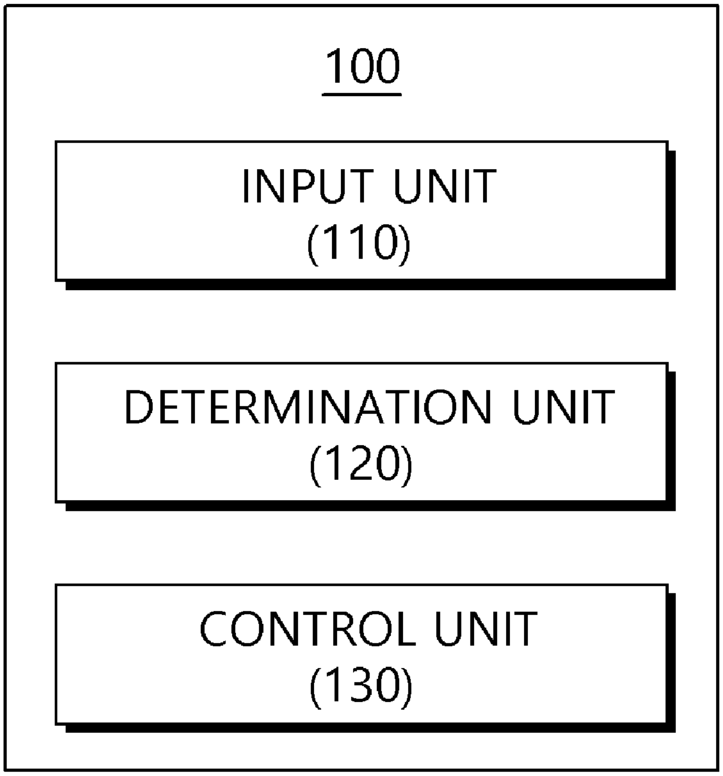
FIG. 2 is a block diagram illustrating an apparatus for controlling a position of a seat for a vehicle according to an exemplary embodiment of the present invention.

FIG. 2 is a block diagram illustrating an apparatus for controlling a position of a seat for a vehicle according to an exemplary embodiment of the present invention.

Referring to FIGS. 1 and 2, an apparatus 100 for controlling a position of a seat for a vehicle according to an exemplary embodiment of the present invention is characterized in that the apparatus 100 varies a relaxation position of the vehicle seat 10 in consideration of a current position of the vehicle in the relaxation mode operation state of the vehicle seat 10 so that the vehicle maintains the same position as when the vehicle is located on a flat surface, thereby providing the user with the comfort felt on a flat surface.

The apparatus 100 for controlling a position of a seat for a vehicle includes an input unit 110, a determination unit 120, and a control unit 130.

The input unit 110 may receive an input of a relaxation mode operation command for the vehicle seat 10 from a user. The input unit 110 may be a touch-type switch, but is not limited thereto.

The determination unit 120 may determine a current position state of the vehicle according to the relaxation mode operation command of the vehicle seat 10. The determination unit 120 may receive G sensing values indicative of movement and speed changes of the vehicle seat 10 from G sensors mounted on the cushion part 11, the backrest part 13, and the operation module 15. The determination unit 120 may compare a preset reference position value with the received G sensing value. The reference position value may be prepared based on sensing information of a track-mounted G-sensor installed under the vehicle seat 10, a yaw rate G-sensor mounted on the vehicle, or an Electronic Stability Control (ESC) device of the vehicle.

When the vehicle is located on an inclined road and a difference between the G-sensing value and the reference position value is equal to or greater than a reference threshold, the determining unit 120 may determine that position compensation of the vehicle seat 10 is required. The reference threshold may be set appropriately based on user's needs.

The control unit 130 may calculate a tilt of the vehicle by using the reference position value when the position compensation of the vehicle seat 10 is required. The control unit 130 may control the operation module 15 by using the tilt of the vehicle so that the rotational axis of the connection portion of the cushion part 11 and the backrest part 13 may rotate. This allows the position of the cushion part 11 and the backrest part 13 to be compensated for changes in position depending on the position state of the vehicle.

Figure 3:
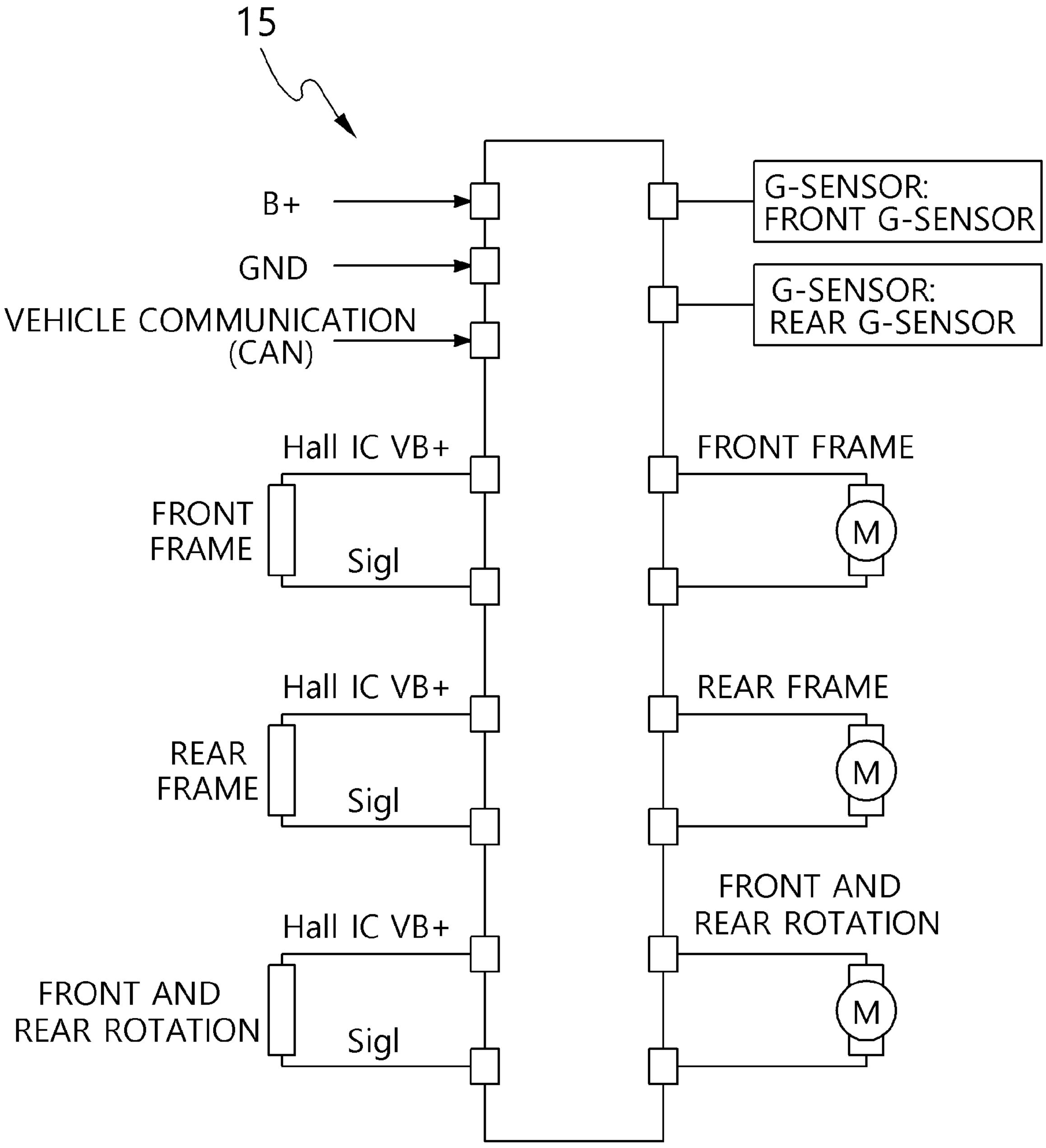
FIG. 3 is a diagram schematically illustrating a circuit diagram of an operation module.

FIG. 3 is a diagram schematically illustrating a circuit diagram of the operation module.

Referring to FIG. 3, the operation module 15 includes a front frame and a rear frame configured to support a bottom end of the cushion part 11. Each of the front frame and the rear frame may be equipped with a G-sensor. The front frame is operated by a motor to adjust the height of the cushion part 11 on the forward side. The front frame and the rear frame may be installed on separate tracks mounted inside the vehicle to be slidingly movable in the front and rear directions. The front frame and the rear frame may slidingly movable in the front and rear directions by the motors.

Figure 4:
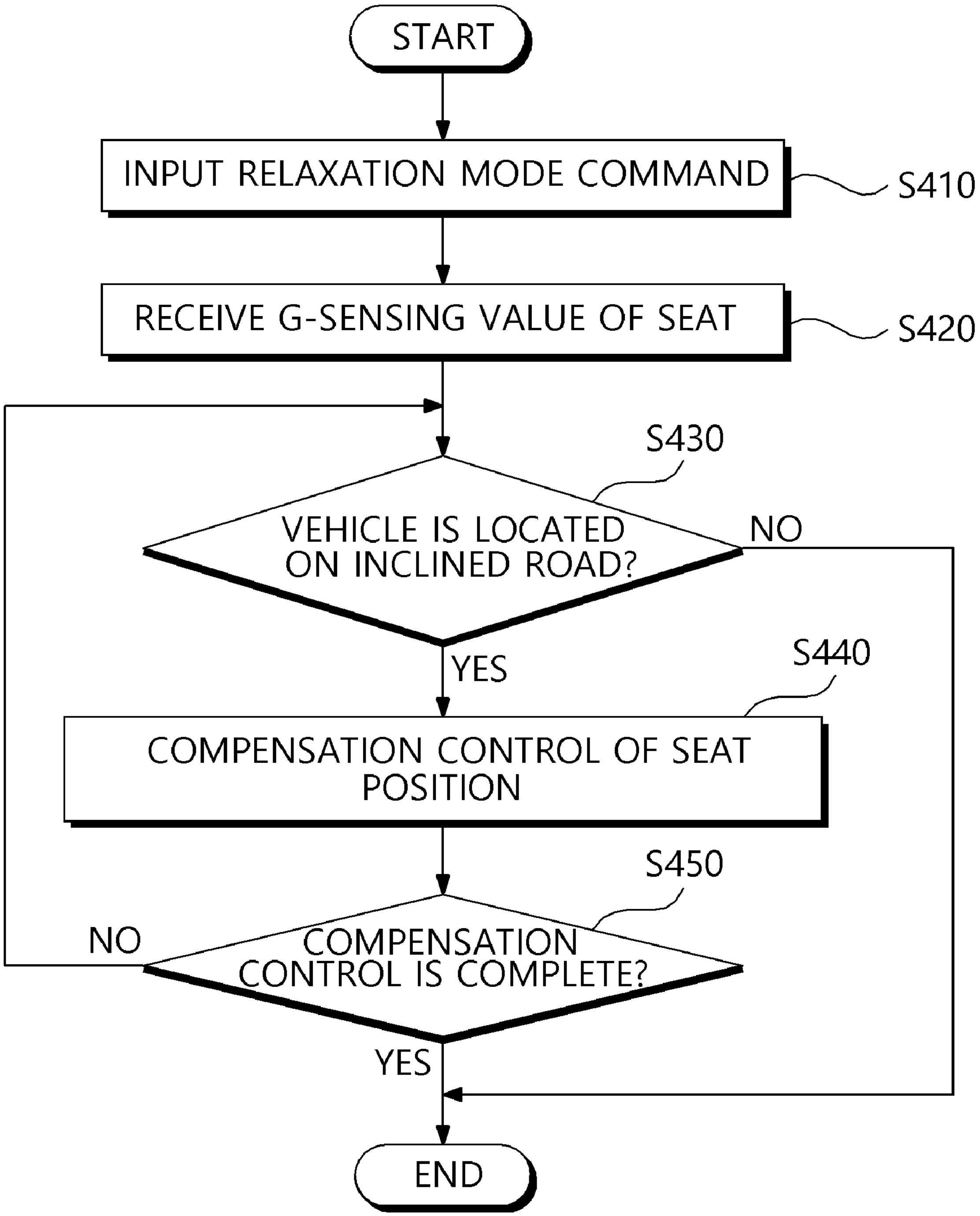
FIG. 4 is a flowchart of a method of controlling a position of a seat for a vehicle according to an exemplary embodiment of the present invention.

FIG. 4 is a flowchart of a method of controlling a position of a seat for a vehicle according to an exemplary embodiment of the present invention.

Referring to FIG. 4, a method of controlling a position of a seat for a vehicle according to an exemplary embodiment of the present invention is characterized in varying a relaxation position of the vehicle seat 10 in consideration of a current position of the vehicle in the relaxation mode operation state of the vehicle seat 10 so that the vehicle maintains the same position as when the vehicle is located on a flat surface, thereby providing the user with the comfort felt on a flat surface.

In an input operation S410, the input unit 110 receives a relaxation mode operation command for the vehicle seat 10 from a user.

In a receiving operation S420, the determination unit 120 may receive a sensing value from a G-sensor mounted on the vehicle seat 10, and sensing information of a G-sensor mounted on the track under the operation module 15, a yaw rate G-sensor of the vehicle, or an ESC device.

In a determination operation S430, the determination unit 120 may determine a current position state of the vehicle based on the relaxation mode operation command of the vehicle seat 10. The determination unit 120 may compare a preset reference position value with the received G sensing value. The reference position value may be prepared based on sensing information of a G-sensor mounted on the operation module 15, a yaw rate G-sensor mounted on the vehicle, or an ESC device of the vehicle. When the vehicle is located on an inclined road and a difference between the G-sensing value and the reference position value is equal to or greater than a reference threshold, the determining unit 120 may determine that position compensation of the vehicle seat 10 is required. The reference threshold may be set appropriately based on user's needs.

In a position control operation S440, the control unit 130 may calculate a tilt of the vehicle by using the reference position value when position compensation of the vehicle seat is required. The control unit 130 may control the operation module 15 by using the tilt of the vehicle so that the rotational axis of the connection portion of the cushion part 11 and the backrest part 13 may rotate. This allows the position of the cushion part 11 and the backrest part 13 to be compensated for changes in position depending on the position state of the vehicle.

In a compensation determination operation S450, the determination unit 120 determines whether the compensation control has been completed by using the G-sensing value of the vehicle seat 10 and the reference position value of the vehicle. The determination unit 120 may determine that the compensation control is complete when the difference between the G-sensing value and the reference position value is less than the reference threshold.

The control unit 130 may re-perform the compensation control when the position state of the vehicle changes before the compensation control is completed.

Although the exemplary embodiment of the present disclosure has been described for illustrative purposes, those skilled in the art will appreciate that various modifications, additions and substitutions are possible, without departing from the essential characteristic of the invention. Therefore, the exemplary embodiments disclosed in the present disclosure and the accompanying drawings are not intended to limit the technical spirit of the present disclosure, but are intended to illustrate the scope of the technical idea of the present disclosure, and the scope of the present disclosure is not limited by the exemplary embodiment and the accompanying drawings.

The operations and/or operations according to the present invention may occur in different orders, or in parallel, or simultaneously in different exemplary embodiments for different epochs and the like as may be appreciated by those skilled in the art.

Depending on the exemplary embodiment, a part or the entirety of the operations and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling a position of a vehicle seat in a vehicle, the apparatus comprising:
at least one processor configured to:
receive, from a user, a command to operate relaxation mode of the vehicle seat,
compare a position sensing value for the vehicle seat with a preset reference position value for the vehicle while the relaxation mode is being maintained,
wherein the position sensing value is obtained based on a sensor reading of a first G-sensor disposed on the vehicle seat,
wherein the preset reference position value is prepared based on a sensor reading of a second G-sensor disposed under the vehicle seat and mounted on a track on which the vehicle seat is mounted;
determine that position compensation of the vehicle seat is required when a difference between the position sensing value and the preset reference position value is equal to or greater than a predetermined reference threshold; and
control an operation module of the vehicle seat to compensate a position of the vehicle seat to maintain the relaxation mode when the difference between the position sensing value and the preset reference position value is equal to or greater than the predetermined reference threshold such that the difference between the position sensing value and the preset reference position value is less than the predetermined reference threshold while the relaxation mode is being maintained.

2. The apparatus of claim 1, wherein the preset reference position value is prepared also based on a sensor reading of a yaw rate G-sensor mounted on the vehicle or an Electronic Stability Control (ESC) device of the vehicle.

3. The apparatus of claim 1, wherein when the at least one processor determines that the vehicle is tilted and that the position compensation of the vehicle seat is required, the at least one processor is configured to calculate a tilt of the vehicle by using the preset reference position value, and control the operation module of the vehicle seat based on the tilt of the vehicle.

4. The apparatus of claim 3, wherein after controlling the operation module of the vehicle seat, the at least one processor is configured to determine whether the controlling is completed by using the position sensing value of the vehicle seat and the preset reference position value.

5. A method of controlling a position of a vehicle seat in a vehicle, the method comprising:

receiving, by at least one processor, a command to operate a relaxation mode for the vehicle seat from a user;

comparing, by the at least one processor, a position sensing value for the vehicle seat and a preset reference position value for the vehicle while the relaxation mode is being maintained, wherein the position sensing value is obtained based on a sensor reading of a first G-sensor disposed on the vehicle seat, wherein the preset reference position value is prepared based on a sensor reading of a second G-sensor disposed under the vehicle seat and mounted on a track on which the vehicle seat is mounted;

determining that position compensation of the vehicle seat is required when a difference between the position sensing value and the preset reference position value is equal to or greater than a predetermined reference threshold; and controlling, by the at least one processor, an operation module of the vehicle seat to compensate a position of the vehicle seat to maintain the relaxation mode when the difference between the position sensing value and the preset reference position value is equal to or greater than the predetermined reference threshold such that the difference between the position sensing value and the preset reference position value is less than the predetermined reference threshold while the relaxation mode is being maintained.

6. The method of claim 5, wherein the preset reference position value is prepared also based on a sensor reading of a yaw rate G-sensor mounted on the vehicle or an Electronic Stability Control (ESC) device of the vehicle.

7. The method of claim 5, wherein the controlling of the operation module of the vehicle seat includes, when the position compensation of the vehicle seat is determined to be required, calculating a tilt of the vehicle by using the preset reference position value, wherein the operation module of the vehicle seat is controlled using the tilt of the vehicle.

8. The method of claim 7, further comprising:

determining, by the at least one processor, whether the controlling of the operation module is completed by using the position sensing value of the vehicle seat and the preset reference position value, after the controlling the operation module of the vehicle seat is performed.

* * * * *